Oct. 30, 1923.  
T. D. McCOWN ET AL  
1,472,564  
AUTOMATIC DIRIGIBLE HEADLIGHT  
Filed July 29, 1922   2 Sheets-Sheet 1
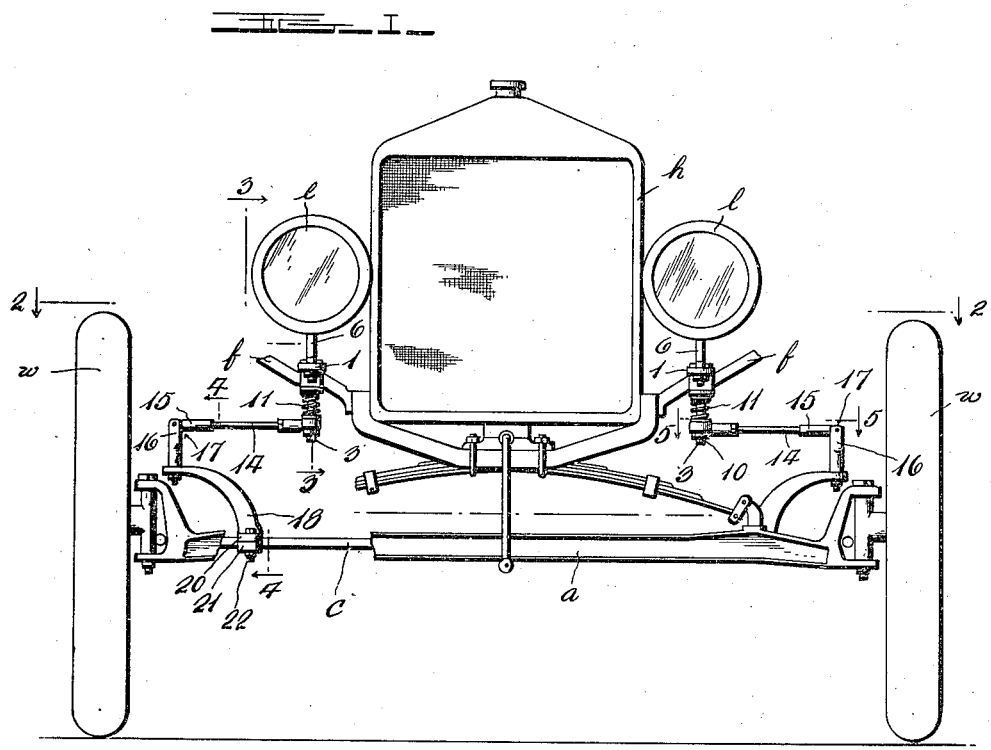
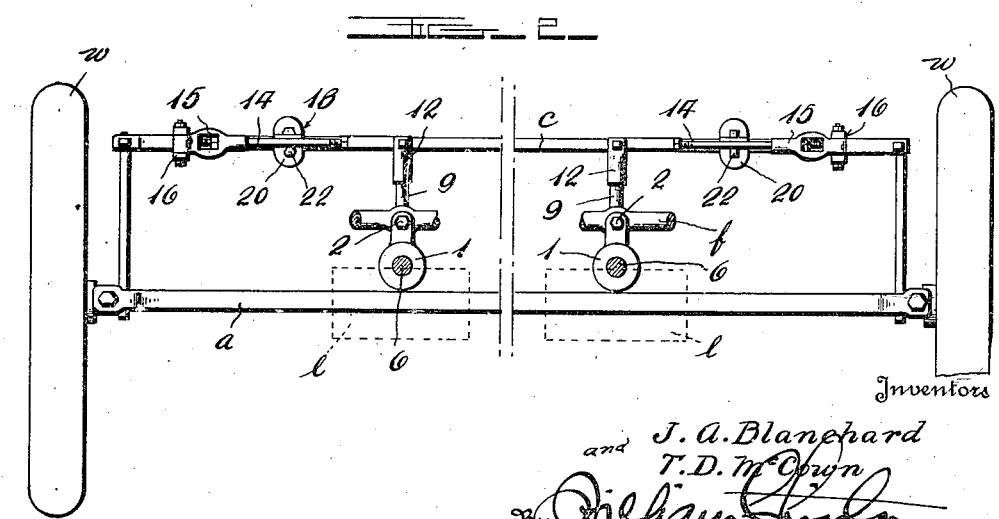
Inventors  
J. A. Blanchard  
and T. D. McCown  
By  
Attorney Oct. 30, 1923.
T. D. McCOWN ET AL
1,472,564
AUTOMATIC DIRIGIBLE HEADLIGHT
Filed July 29, 1922
2 Sheets-Sheet 2
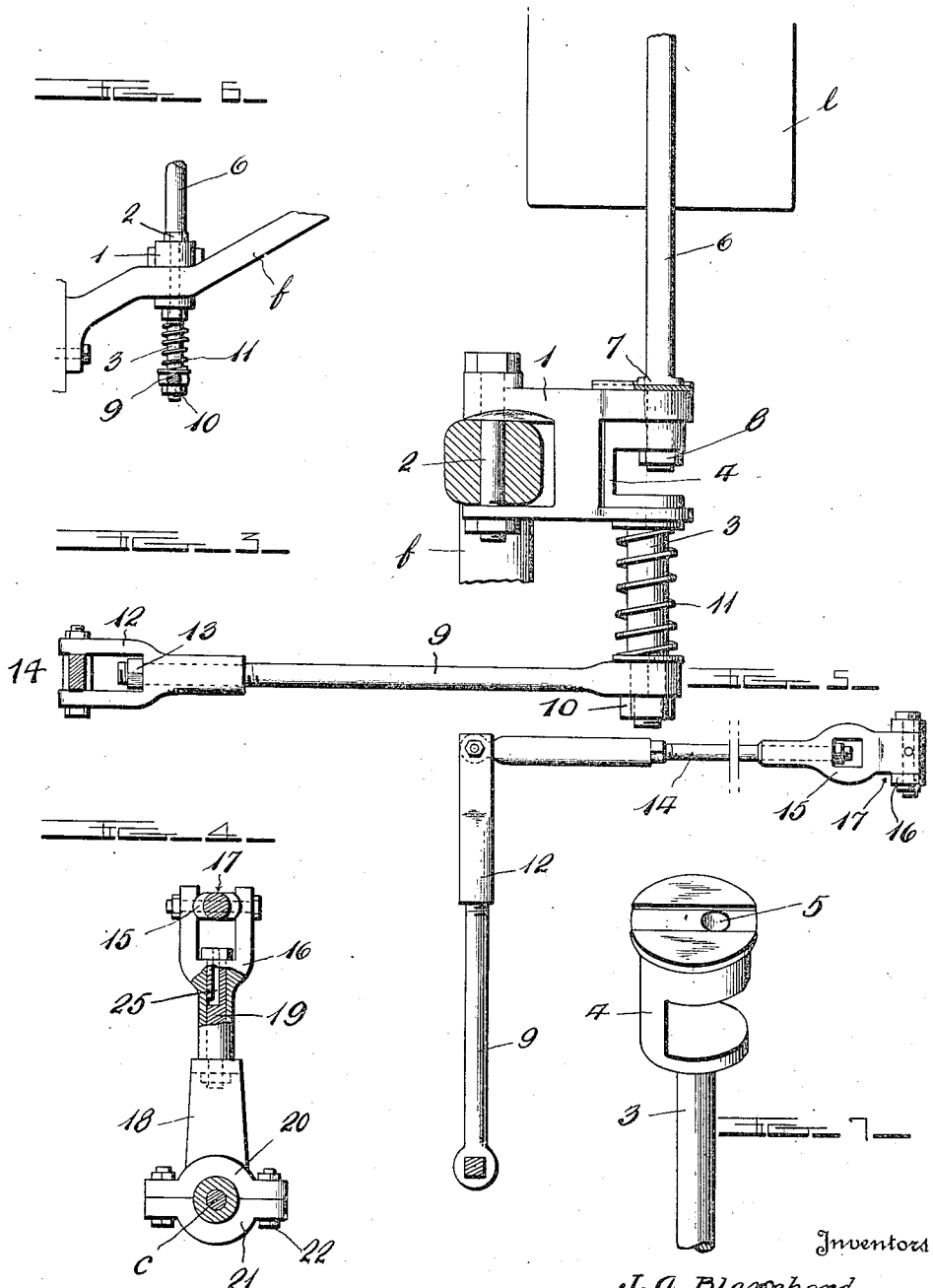
Inventors
J. A. Blanchard
and T. D. McCown
By William Chunn
Attorney Patented Oct. 30, 1923.

1,472,564

UNITED STATES PATENT OFFICE.

THOMAS D. McCOWN AND JAMES A. BLANCHARD, OF POPLAR BLUFF, MISSOURI.

AUTOMATIC DIRIGIBLE HEADLIGHT.

Application filed July 29, 1922. Serial No. 578,487.

*To all whom it may concern:*

Be it known that we, THOMAS D. Mc-COWN and JAMES A. BLANCHARD, citizens of the United States of America, residing at Poplar Bluff, in the county of Butler and State of Missouri, have invented certain new and useful Improvements in Automatic Dirigible Headlights; and we do hereby declare that the following is a full, clear, concise, and exact description of the invention, such as will enable others skilled in the art to which it appertains to make and use the same.

This invention relates to improvements in automatic dirigible headlights, particularly, to those forms of automatically dirigible headlights as used upon motor driven vehicles, and has for an object to provide dirigible headlights, the headlight supporting staff of which may be adjusted to vary the positioning of the headlights with relation to the vehicle steering wheels and their connection to said wheels.

It is likewise an object of the invention to provide a novel form of bracket for supporting the headlight staffs, such brackets being so formed that in addition to providing a simple and reliable mounting, there is also provided a bracket in which the bearing arms and standards may be readily inserted.

Other objects will be in part obvious and in part pointed out hereinafter.

In order that the invention and its mode of operation may be readily understood by persons skilled in the art, we have in the accompanying illustrative drawings, and in the detailed following description based thereon, set out one possible embodiment of the same.

In these drawings:—

Figure 1 is a front elevation of an automobile equipped with the improved dirigible headlights;

Figure 2 is a horizontal section taken on the line 2—2 of Figure 1 looking in the direction in which the arrows point;

Figure 3 is an enlarged fragmentary detail in section taken on the line 3—3 of Figure 1 looking in the direction in which the arrows point;

Figure 4 is a similar section taken on the line 4—4 of Figure 1 looking in the direction in which the arrows point;

Figure 5 is a fragmentary detail in elevation showing the mounting of the headlight supporting staffs upon the vehicle.

Figure 6 is a detail fragmentary view showing the manner in which the supporting brackets for the headlights are mounted upon the main support; and, Figure 7 is a detail perspective view of one of the bearing arms with its standard.

Having more particular reference to the drawings, in connection with which like characters of reference will designate corresponding parts throughout, $h$ designates the hood of a motor driven vehicle equipped with the improved headlights, $w$ the steering wheels thereof which are rotatably mounted in suitable bearings arranged upon the opposite ends of the axle $a$, as is common in the art. In order that collective movement may be imparted to the steering wheels $w$, from the steering gear of the vehicle, not shown, a connecting rod $c$ is provided and, as will be understood, is connected at its opposite ends to the steering knuckles of the wheels $w$.

Brackets generally indicated by the numeral 1 are provided and have their bifurcated rearward extemities engaged over the bracket arms $f$ serving to support the usual wheel fenders of the automobile. A bolt 2 is passed through vertically aligned openings formed in each side of the bifurcated extemities and as will be understood, said bracket, in this way, will be securely retained in position upon the vehicle.

In order that the several headlights $l$ of the vehicle may be rotatably supported upon their respective brackets 1, rotatable shafts 3 are provided and have enlarged bearing arms 4 formed upon their upper ends, the uppermost portions of which arms are circular in shape and provided with eccentric bearing openings 5 adapted to receive the screw threaded lower ends of headlight supporting standards 6 therein, said standards having shoulders 7 formed thereon adapted for engagement with the upper or adjacent portions of the bearing arms 4 of the several staffs. To secure the standards 6 against accidental or undue displacement with relation to the staffs 3, locking nuts 8 may be and preferably are turned into engagement with the screw threaded lower ends of the same, which as will be noted, extend for distances below the upper portions of their respective bearing brackets 4.

With a view towards providing means for connecting the rotatable staffs 3 to the steering wheels $w$ of the vehicle, arms 9 are provided and have squared bearing openings formed in certain of their ends adapted to be snugly engaged over squared extensions formed on the lower ends of said staffs 3, as shown in the Figure 3, whereupon locking nuts 10 are turned into engagement with the screw threaded extensions on said staffs for preventing displacement of said arms. Expansible coiled springs 11 may be and preferably are arranged upon those portions of the rotatable staffs 3 intermediate their respective brackets 1 and the arm 9 and as will be understood, will afford means for preventing vertical vibratory movement of the staffs or their bearing brackets 4. Bifurcated brackets 12 are rotatably engaged with the free extremities of the arms 9 and are secured against lateral displacement with relation thereto by means of locking nuts 13.

Other arms 14 are provided and are pivotally connected between the bifurcated extremities of the several brackets 12 in a manner substantially at right angles to the pivotal mounting of said brackets upon the adjacent ends of the arms 9. Swivel connections or bearing brackets 15 are screw threaded upon the free extremities of the last mentioned arms 14 and are pivotally connected between the bifurcated extremities of forked bearing brackets 16, as indicated at 17. These bifurcated bearing brackets are arranged in substantially vertical positions upon the upper ends of substantially semi-circular connecting arms 18 and are formed with hollow shanks through which connecting bolts 19 are adapted to pass, the locking nuts engaging the screw threaded extremities of said bolts being engaged upon the under sides of the adjacent portions of said arms 18 and in consequence, serving to positively and rigidly secure the forked brackets 16 in position thereon. The remaining or lower ends of the semi-circular connecting arms 18 are provided with bearings 20 over which bearing plates 21 are adapted to clampingly engage and be secured in position through the medium of bolts 22. These bearings 20 and their respective bearing plates 21 are engaged about and clampingly secure adjacent portions of the connecting rod c of the vehicle therebetween and in consequence, permit of connection of the headlights l to the steering wheels w of the vehicle through the connecting rod c of its steering gear.

Because of the adjustable connection between the swivel connections 15 and the screw threaded portion of the arms 14, it will be understood that the relative positioning of the several headlights l with relation to the steering wheels w may be varied, such as conditions or preference may dictate.

In operation of the improved dirigible headlights, with lateral movement of the connecting rod c under influence of the vehicle steering gear proper, the wheels w will be swung upon their respective pivotal mountings. Simultaneously with swinging of the steering wheel w, the lateral movement of the connecting arms 18 will impart pulls to the arms 14 connected thereto through the medium of the forked brackets 16, which in turn will be transmitted to the arms 9 and from thence, to the rotatable headlight supporting staffs 11, rotating the latter in their respective bearings 1. By outward adjustment of the swivel 15 on the arm 14, the timing of the movement of the headlights l with relation to that of the steering wheels may be regulated to the desired nicety, as above noted.

The connecting bolts 19 employed in connection with the brackets 16 may be and preferably are provided with lubricant distributing ways 25, adapted to discharge lubricant onto the bearing portions of the bolts, the upper ends of said ways opening onto the bolts at points adjacent the heads of the same.

Manifestly, the construction shown is capable of considerable modification and such modification as is within the scope of our claim, we consider within the spirit of our invention.

We claim:

In a dirigible headlight mounting of the character described, supports, a pair of brackets, each of said brackets having horizontally extending bifurcated ends, one of the bifurcations being adapted to straddle and to be secured to the adjacent support, the upper and lower legs forming the other bifurcation being provided with vertically aligned circular openings, the lower of said openings being of less diameter than the upper, a bearing arm receivable in said openings, an annular shoulder formed upon the upper end of said arm and adapted to bear against the upper face of the upper leg, the lower end of said arm being reduced for snug engagement with the lower opening and to provide a bearing pintle adjacent the upper face of the lower leg, a lamp supporting standard rising from the other end of said bearing arm, a reduced staff extended from the lower end of said arm and means connected to said shaft for transmitting oscillatory movement thereto.

In witness whereof we have hereunto set our hands.

THOMAS D. McCOWN.
JAMES A. BLANCHARD.